Oct. 28, 1941.　　　　L. H. KENNON　　　　2,260,381
VALVE ASSEMBLY
Filed Dec. 19, 1938
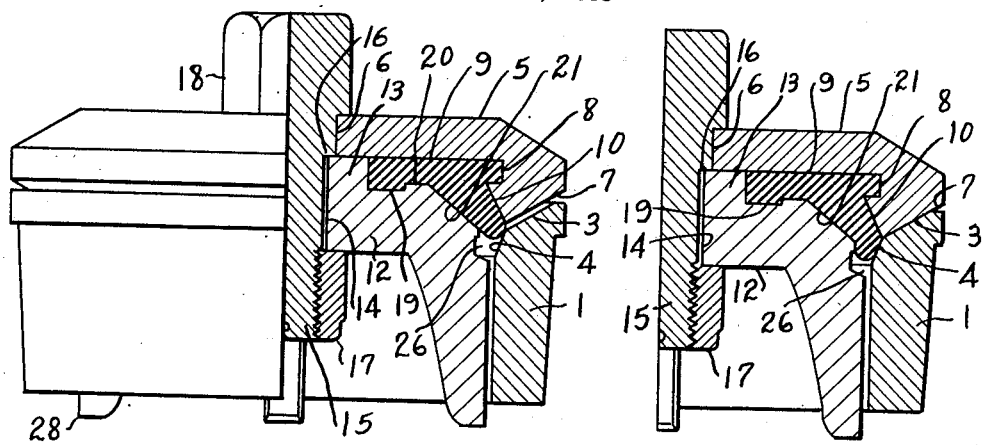
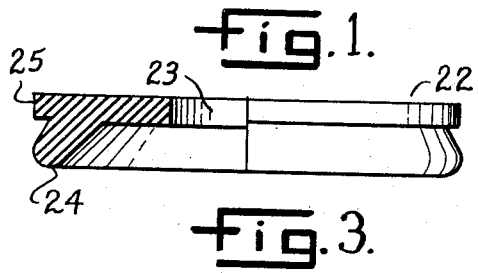
Fig. 3.
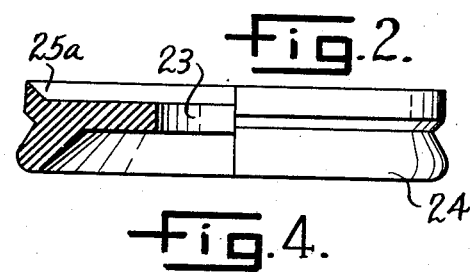
Fig. 4.
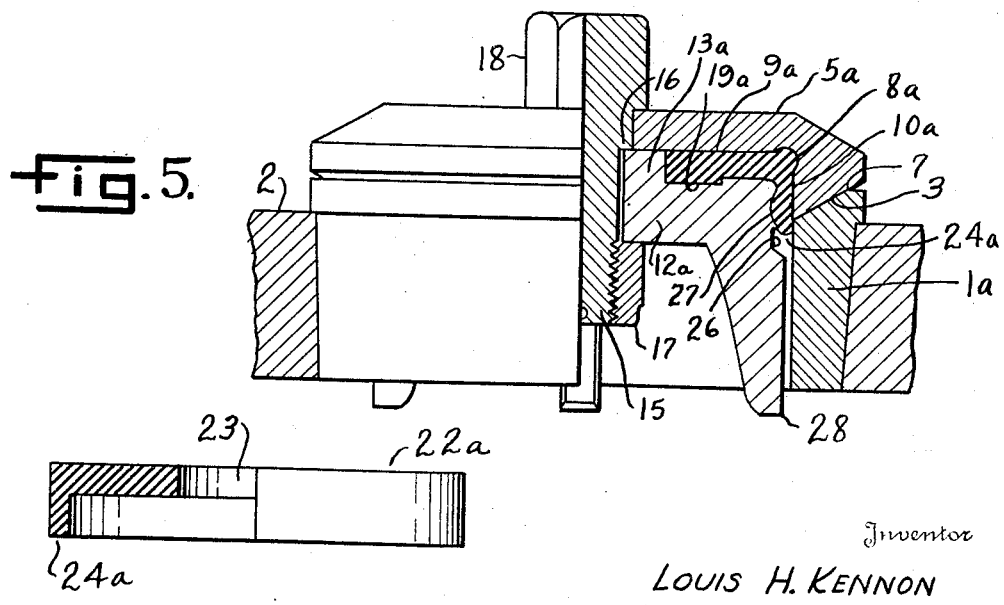
Inventor
LOUIS H. KENNON
Edward V. Hardway,
Attorney Patented Oct. 28, 1941

2,260,381

UNITED STATES PATENT OFFICE 2,260,381

VALVE ASSEMBLY

Louis H. Kennon, Houston, Tex.

Application December 19, 1938, Serial No. 246,612

6 Claims. (Cl. 251—127)

This invention relates to a valve assembly.

An object of the invention is to provide a valve assembly specially adapted for use in pumps, particularly slush pumps and equipped with novel means for forming an inside, fluid tight seal between the valve seat and valve disc when the valve is closed.

Another object of the invention is to provide, in a valve assembly, a novel type of valve seat.

It is another object of the invention to provide in a valve assembly a novel type of valve disc.

A still further object of the invention is to provide in a valve assembly a novel type of clamp plate for clamping and securely holding the seal ring in place.

The invention also embodies a novel type of seal ring formed of rubber or other suitable resilient material.

The valve disc and clamp plate are of such special formation, and are so secured together as to securely clamp and anchor the seal ring in place with the free, annular margin of the seal ring so positioned relative to the valve seat as to fit firmly against the inner side of said seat to break the joint between the valve disc and the valve seat when the valve is closed.

It is another object of the invention to provide an assembly of the character described wherein the contacting areas of the valve face and seat face are arranged around, or on the outside of the sealing margin of the seal ring thus providing a large area to take the valve stroke thus distributing the wear and shock and also providing a reduced sealing area.

Another feature of the assembly resides in the provision of an annular, external groove about the clamp plate beneath the free margin of the seal ring to provide space into which the material of the seal ring may flow as the material of the contacting faces of the valve disc and valve seat wear away. This additional space being of sufficient capacity to prevent pinching or mutilation of the free margin of the seal ring.

With the above and other objects in view the invention has particular relation to certain novel features of construction, operation and arrangement of parts, examples of which are given in this specification and illustrated in the accompanying drawing, wherein:

Figure 1 shows a side elevation of the assembly, partly in section, showing the valve partly, but not completely, closed.

Figure 2 shows a fragmentary, sectional view showing the valve completely closed.

Figure 3 shows a side view, partly in section, of one form of seal ring employed.

Figure 4 shows a similar view of a slightly modified form of said seal ring.

Figure 5 shows a side elevation, partly in section, of another embodiment of the assembly showing the valve completely closed, and Figure 6 shows a side view, partly in section, of the type of seal ring employed in the embodiment illustrated in Figure 5.

Referring now more particularly to the drawing wherein like numerals of reference designate the same parts in each of the figures, the numeral 1 designates a valve seat which, in the present illustration, is shown mounted in the partition 2 of a pump. The upper end of the seat is formed with an outwardly flared, or annular, tapered face 3, and beneath the face 3 the seat is provided with the inside, annular guide face 4 which merges with the face 3 but has a greater pitch than that of the face 3.

The numeral 5 designates a valve disc which has a central opening 6. At its outer margin the valve disc has an annular tapering face 7 around its under side of the same pitch as that of the face 3, said faces 7 and 3 being arranged to cooperate.

It will be noted from an inspection of Figures 1 and 2 that the valve disc 5, at its outer margin or rim, is thickened downwardly and is provided with an inside, annular, inwardly facing groove 8 whose upper and lower sides are approximately parallel and whose outer wall is approximately perpendicular to said upper and lower sides. The upper side of the groove 8 is continuous with the lower plane face 9 of the valve disc. Beneath the groove 8 the depending thickened portion of the disc 5 has the downwardly and outwardly flared, annular face 10 which merges with the face 7 at the inner margin of the latter.

The numeral 12 designates an annular clamp plate which has a central, upstanding, tubular boss 13 provided with a central opening 14 of somewhat smaller diameter than the diameter of the openings 6 through the valve disc 5. A clamp bolt 15 is fitted through the registering openings 6, 14 and fits closely through the opening 6. Beneath said opening 6 the bolt 15 is reduced in diameter thus forming an external, annular shoulder 16 in a common plane with the face 9. The clamp bolt 15 is maintained in assembled relation with the valve disc 5 and with the clamp bolt 15 by means of a clamp nut 17 screwed onto the lower end of said bolt and by the enlarged head 18 on the other end of the bolt, said head clamping against the disc 5 and said nut clamping against the plate 12.

In the upper side of the clamp plate 12, around the boss 13, there is an annular, upwardly facing groove 19 which is considerably wider, radially than its depth. The bottom of this groove is parallel with the face 9 and its sides are approximately perpendicular to said bottom. It will be noted that the boss 13 extends the required distance above the top surface of the remainder of the clamp plate 12. Around the groove 9 the top surface of the clamp plate is provided with an annular plane face 20 parallel with the face 9 and beyond the face 20 the clamp plate is provided with an outwardly and downwardly tapered, annular face 21 which converges outwardly with relation to the face 10.

The numeral 22 designates, as a whole, a seal ring employed which is formed of resilient material such as rubber. It is annular in general contour having a central opening 23 to receive snugly the boss 13. It has a downwardly and outwardly flared lip 24 whose free margin is oval and the seal ring has an annular rib 25 surrounding the same. In the form shown in Figure 4 this seal ring is slightly modified in that the external, annular rib 25a is slightly flared upwardly since it has been found in practice that in assembling this form may be more easily assembled with the valve disc 5 since the form of rib 25a may be more easily inserted into the groove 8 in assembling the seal ring with the valve disc. After the form of seal ring, shown in Figure 4, has been assembled with the valve disc 5 it will conform in shape to the shape of the form of disc illustrated in Figure 3.

In assembly the seal ring 22 of the form shown either in Figure 3 or Figure 4 may be fitted against the under side of the valve disc 5 with the rib 25, or 25a, fitted into the groove 8. The clamp plate 12 may then be fitted against the under side of said seal ring and the clamp bolt 15 inserted into place and the nut 17 screwed thereon. The upper faces 20, 21 of the clamp plate will contact against the corresponding under portions of the seal rig before the upper end of the boss 13 contacts against the under side of the disc 5. However, as the clamp nut 17 is screwed home the clamp plate will apply compression to the seal ring causing the material of the seal ring to run into and fill the groove 19 and forcing the rib 25, or 25a, tight into the groove 8. The rib 24 will also be compressed between the outwardly converging faces 10, 21 so as to cause the free margin of said lip 24 to extend out the required distance beyond the plane of the face 7 and in position to contact against the guide face 4 as the valve closes. When the nut 17 is screwed home the free end of the boss 13 will abut firmly against the shoulder 16 and the surrounding under side of the face 9 and the seal ring will thus be securely clamped and held in position.

Beneath the protruding free margin of the lip 24 the clamp plate 12 is provided with an external, annular, shallow groove 26 for a purpose to be hereinafter explained.

The margin of the lip 24 will first come into contact with the downwardly and inwardly tapering guide face 4 closing the passageway between the face 3 of the valve seat and the face 7 of the valve disc and as the valve disc 5 moves on to completely closed position the outer margin of the lip 24 will be slightly deformed and forced downwardly and inwardly along said face 4, as shown in Figure 2 thus effectively sealing the joint between the faces 3 and 7. Should the face 7 be prevented from completely seating against the face 3 by sand, small gravel or other obstruction the lip 24 will still contact against the face 4 and form a complete closure.

The faces 3, 7 will be subjected to considerable wear since they take the stroke of the valve disc and if they wear the margin of the lip 24 will be forced further and further downwardly and the groove 26 has accordingly been provided to give space which this lip may enter to prevent its mutilation.

In the form shown in Figure 5 the seat 1a is provided at its upper end with the tapering face 3, as illustrated in Figure 2, but does not have the inside, downwardly tapering face 4 of Figure 2. The valve disc 5a is downwardly thickened at its outer margin or rim and has, at the underside of said downwardly thickened portion, the tapering face 7 which cooperates with the face 3. The underside, or face, 9a of the disc 5a is arranged approximately perpendicular to the inner face 10a of the thickened portion of the disc and these faces 9a, 10a merge in a shallow concave groove 8a extending around the underside of the valve disc 5a. In this embodiment the seal ring 22a is of an inverted, cup shaped form, as shown in Figure 6 and is provided with the opening 23 to closely surround the boss 13a of the clamp plate 12a. The outer side of the clamp plate 12a, above the groove 26, is annularly concaved having a shallow, annular groove 27 arranged opposite and spaced from the face 10a, as clearly shown in Figure 5. When the seal ring 22a is placed under compression, that is, when it is clamped between the valve disc 5a and the clamp plate 12a and the nut 17 is screwed fully home the seal ring 22a will assume the contour shown in Figure 5 completely filling the grooves 8a and 19a and being clamped between the face 10a and the outer margin of the clamp plate so as to completely fill the groove 27. The rim, or lip, 24a of this seal ring will protrude forming an annular free portion which will fit closely within the upper portion of the seat 1a when the valve is closed, as shown in Figure 5, thus breaking the joint between the faces 3 and 7 and forming a fluid tight joint.

In each embodiment the clamp plate is formed with guide wings as 28 spaced apart and depending therefrom and working through the seat 1 to guide the valve.

What I claim is:

1. A valve assembly comprising a seat having an annular face, a valve having an annular face adapted to cooperate with the seat face to open and close the passageway through the seat, an annular resilient free lip on the margin of the valve extended beyond said valve face and adapted to fit totally within the seat and to overlap and cover the joint between the faces when the valve is closed, said valve having an external, annular groove therearound adjacent and beneath said lip to receive the free margin of the lip when the valve is closed.

2. A valve comprising a valve disc having a marginal annular face and an inwardly facing annular groove on one side, a clamp plate fitted against said side of the disc and having a central boss abutting the disc and an annular groove around the boss, a resilient seal ring clamped between said disc and plate with a marginal rib in said groove of the disc and compressed into the groove of said plate, said seal ring having an annular flexible rounded lip whose free margin protrudes beyond said face.

3. A valve comprising a valve disc having a marginal annular face and an inwardly facing annular groove on one side, a clamp plate fitted against said side of the disc and having a central boss abutting the disc and an annular groove around the boss, a resilient seal ring clamped between said disc and plate with a marginal rib in said groove of the disc and compressed into the groove of said plate, said seal ring having an annular lip whose free margin protrudes beyond said face, said plate and disc having annular, opposing, outwardly converging faces between which said lip is clamped.

4. In a valve assembly, a valve disc having a marginal thickened portion on one side formed with outside and inside converging annular faces, said disc having an annular groove adjacent said inside face which faces radially inwardly and which is countersunk into the inside of said thickened portion.

5. In a valve, a clamp plate having a central outstanding boss and a groove countersunk into the plate around the boss, said plate having an outside, annular tapering face, said plate having an external, annular groove therearound adjacent the outer margin of said face, guide wings on the clamp plate, the outer margins of the guide wings being beyond the margin of the plate.

6. In combination a valve seat having an annular flared end seat face and an inside annular substantially cylindrical guide face intersecting the end seat face, a valve disc having an annular flared face shaped to contact with and being the same width as the end seat face, a clamp plate connected to the valve disc, a resilient sealing member clamped between the plate and the disc, said sealing member being formed with a rounded lip protruding slightly radially beyond the clamp plate and adapted to contact solely with the inside guide face to form a seal therewith, said clamp ring having an annular groove to allow free flexing of said lip, said inside guide face being slightly flared to guide the lip.

LOUIS H. KENNON.